A. Nittinger, Jr,
Oscillating Engine,
No. 106,860. Patented Aug. 30, 1870.

Witnesses:
Isaac R. Oakford,
Frank Stout

Inventor:
August Nittinger Jr.
By his Attorney
Charles H. Evans

United States Patent Office.

AUGUST NITTINGER, JR., OF PHILADELPHIA, PENNSYLVANIA.

Letters Patent No. 106,860, dated August 30, 1870.

IMPROVEMENT IN OSCILLATING STEAM-ENGINES.

The Schedule referred to in these Letters Patent and making part of the same.

*To all whom it may concern:*

Be it known that I, AUGUST NITTINGER, Jr., of the city and county of Philadelphia and State of Pennsylvania, have invented a new and useful Improvement in Oscillating Steam-Engines; and I do hereby declare that the following is a full, clear, and exact description of the construction and operation of the same.

My invention relates to that class of oscillating steam-engines in which the cylinder and steam-chest are applied together in such a manner that the cylinder may turn on the steam-chest. This is accomplished by making the bottom of the cylinder convex, and resting it in a concave made in the upper part of the steam-chest.

The present invention consists in arranging springs under the bearings which support the trunnions of the cylinder in such a manner that it (the cylinder) is confined closely down on the steam-chest, so that the steam cannot escape between them while the cylinder is in motion. A turn-table is also connected with the cylinder, so that it can be turned around and the motion of the piston reversed, so as to cause the crank of the engine to turn under instead of over.

Figure 1:
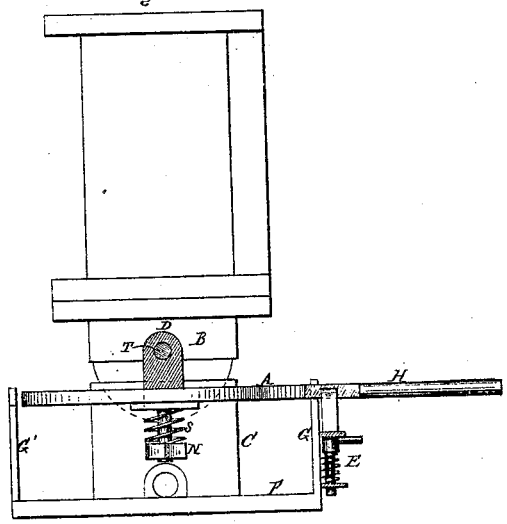
Figure 1 is a side elevation of my improvements in oscillating steam-engines.
Figure 2:
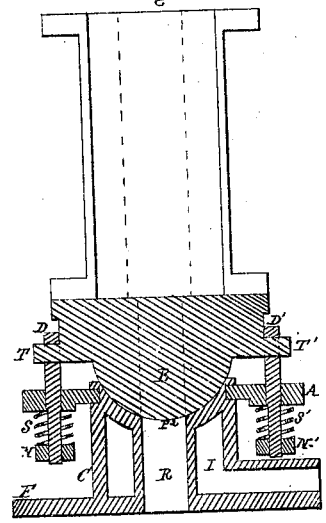
Figure 2 is a vertical section of the same.
Figure 3:
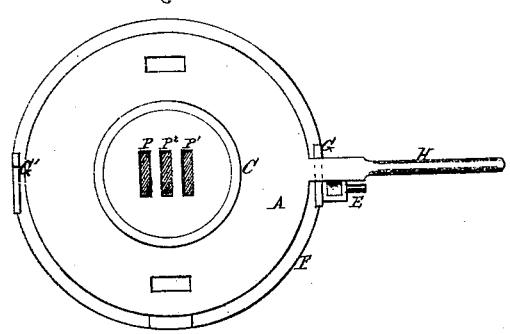
Figure 3 is a plan view of the steam-chest, with the cylinder removed.
Figure 4:
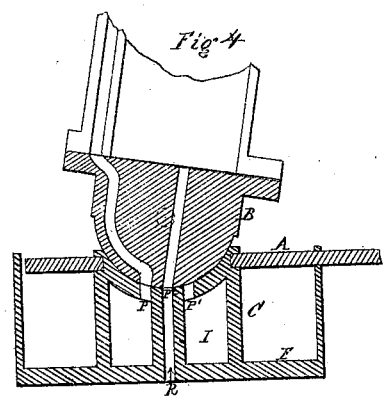
Figure 4 is a sectional view of the steam-chest and lower part of the cylinder.

To enable those skilled in the art to make and use my invention, I will now proceed to describe its construction and operation.

The steam-chest C is made cylindrical in form, and is provided at the lower part with a flange, F, which forms the base or bed-plate of the engine, and in the interior of the same is arranged an induction-chamber, I, provided with ports P and P¹, and an eduction-chamber, R, provided with a port, P².

The upper part of the said steam-chest is made concave, and into which is fitted the lower end of the base-piece B, to which the cylinder is firmly bolted, and on the opposite sides of the base-piece are formed trunnions T and T'.

The trunnions are fitted into bearings D and D'.

These bearings are composed of two uprights, the lower ends of which are made circular, and are passed through an annular plate, A, and are provided with nuts N and N' and coiled springs S and S'.

The central portion of the plate A encircles the cylindrical part of the steam-chest near the upper end, an annular recess being made to receive it, so as to allow it to be revolved, and at the same time carrying around with it the bearings D and D', which support the cylinder.

The plate A has formed or secured on one side of it a handle, H, which engages with a catch, E, attached to one side of an upright, G, which rises above the lower flange F.

On the opposite side of the said flange is a similar upright, G', which supports the handle H when the plate is turned. This upright is also supplied with a catch for holding the plate when turned in the position desired.

The coiled springs S and S' are of sufficient elasticity to draw the bearings D and D' downward, and thus cause the base-piece B to press with sufficient force on the steam-chest C to form a flexible steam-tight joint. The base-piece and the steam-chest, in this case, are ground and fitted together.

When it is desired to reverse the motion of the piston, and cause the crank to turn in a contrary direction, or to turn under instead of over, the plate A is turned completely around, by means of the handle H, in the same manner as an ordinary turn-table, which causes the steam to enter the opposite port, and to act on the opposite side of the piston.

I do not wish to claim an oscillating steam-engine in which the lower part is made concave or convex, so as to fit over a corresponding protuberance, or in a depression made in the steam-chest which supports the cylinder; but What I do claim, and desire to secure by Letters Patent, is—

1. The construction and arrangement of the bearings D and D', coiled springs S and S', nuts N and N', plate A, and handle H, as and for the purpose herein specified.

2. In combination with the above, the steam-chest C, provided with a flange, F, uprights G and G', and catches E, in the manner and for the purpose herein specified.

In testimony whereof I have hereunto signed my name in the presence of two subscribing witnesses.

AUGUST NITTINGER, Jr.

Witnesses:
ISAAC R. OAKFORD,
GEO. E. NICHOLS.